T. P. PAYNE.
RIVETING MACHINE.
APPLICATION FILED MAR. 5, 1914.
1,241,250.
Patented Sept. 25, 1917.
9 SHEETS—SHEET 1.
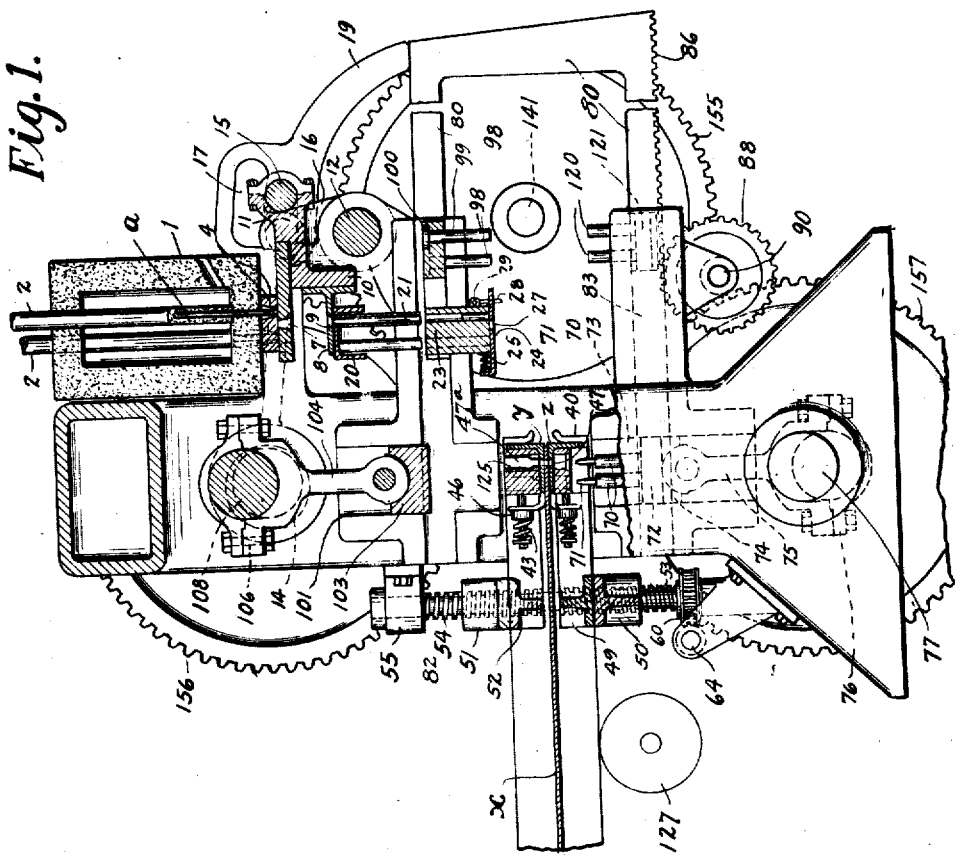
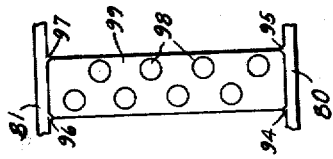
WITNESSES
T. P. Payne INVENTOR
BY John D Morgan
ATTORNEYS

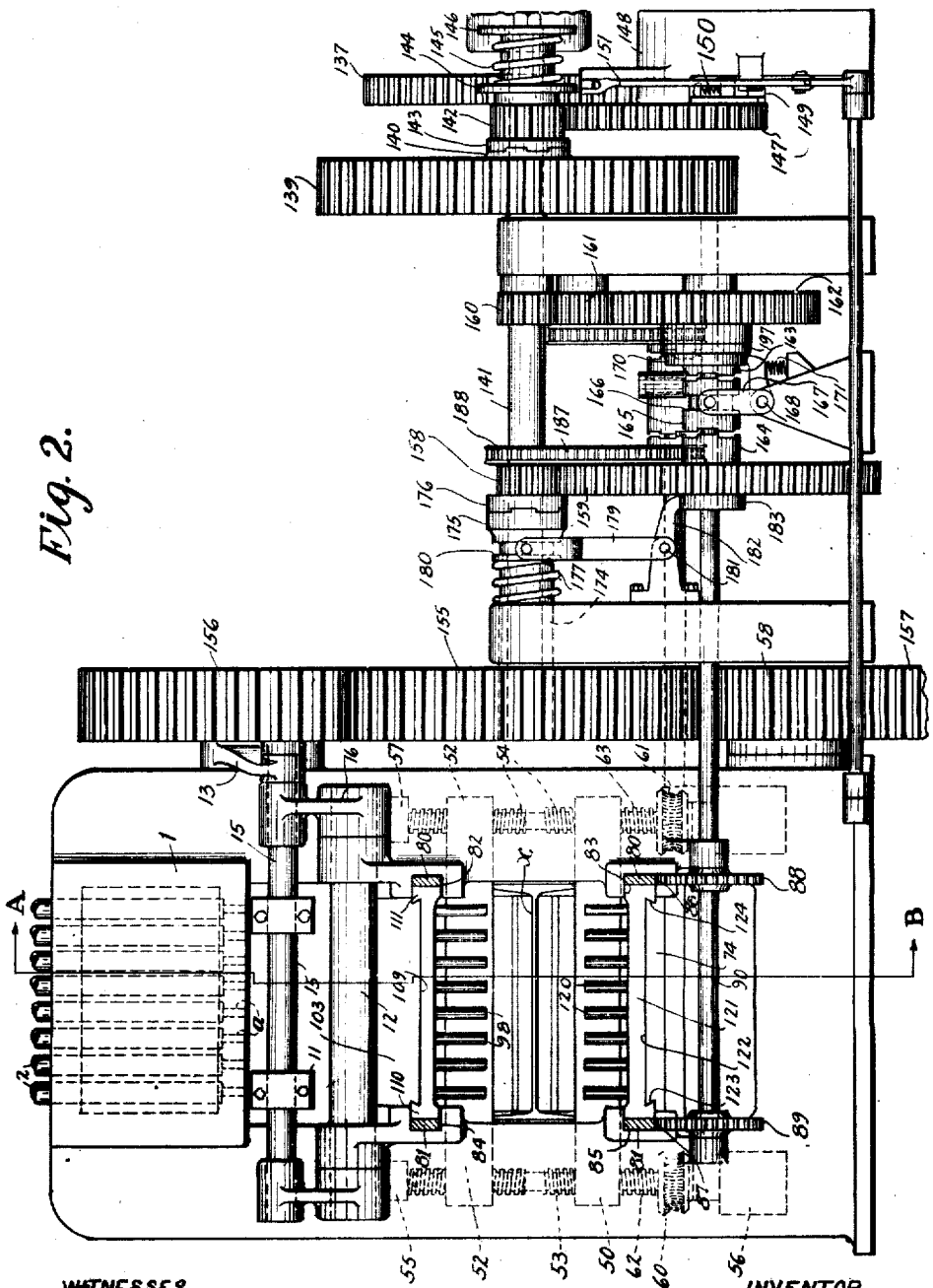

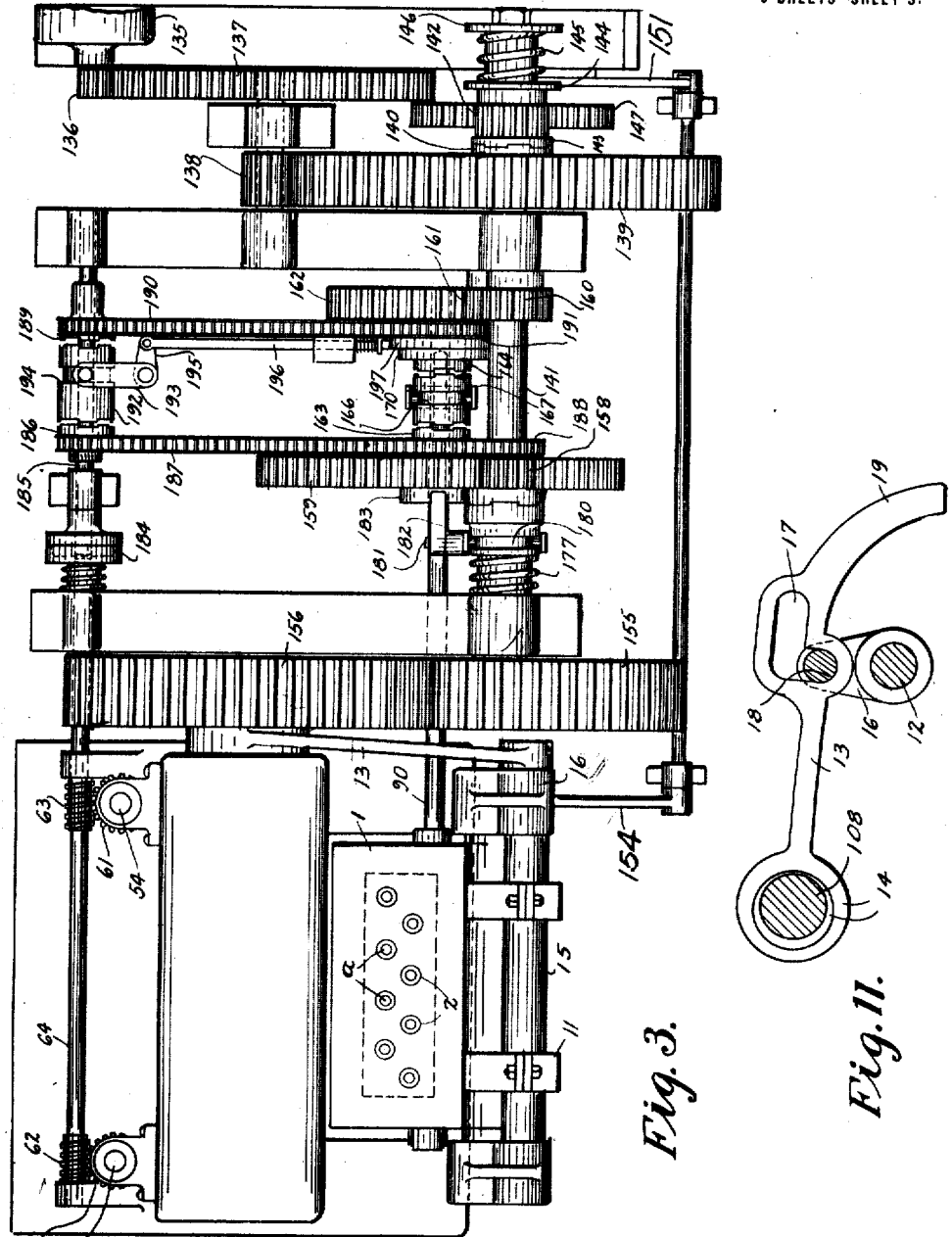

T. P. PAYNE.
RIVETING MACHINE.
APPLICATION FILED MAR. 5, 1914.

1,241,250.

Patented Sept. 25, 1917.
9 SHEETS—SHEET 4.

WITNESSES:

INVENTOR
T. P. Payne
BY
John D. Morgan
ATTORNEY

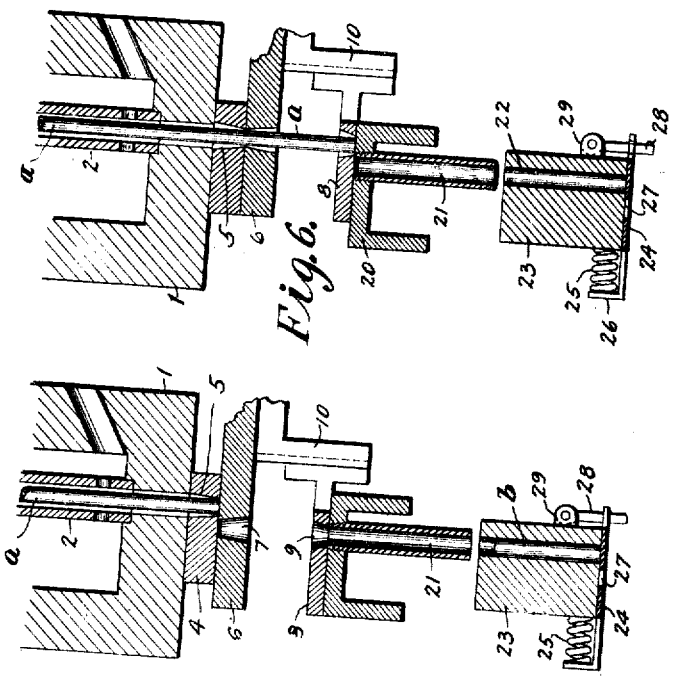
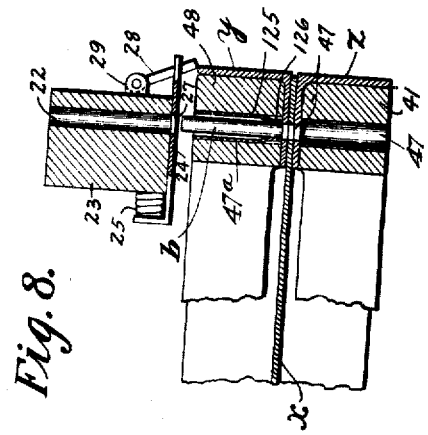

T. P. PAYNE.
RIVETING MACHINE.
APPLICATION FILED MAR. 5, 1914.

1,241,250.

Patented Sept. 25, 1917.
9 SHEETS—SHEET 6.

WITNESSES:

INVENTOR
T. P. Payne
BY
John D. Morgan
ATTORNEY

T. P. PAYNE.
RIVETING MACHINE.
APPLICATION FILED MAR. 5, 1914.
1,241,250.
Patented Sept. 25, 1917.
9 SHEETS—SHEET 7.
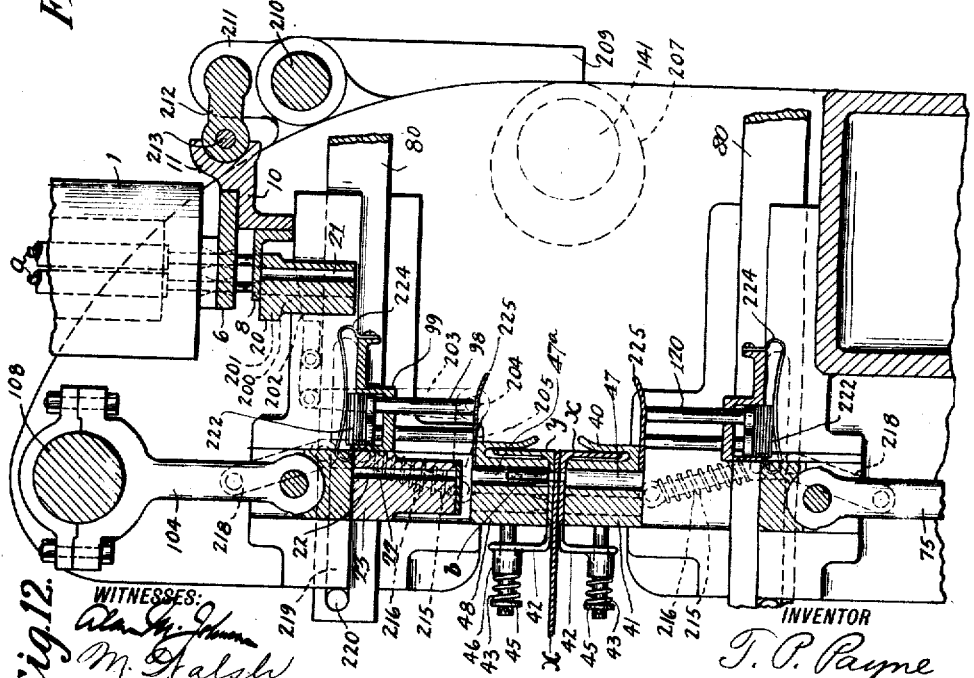

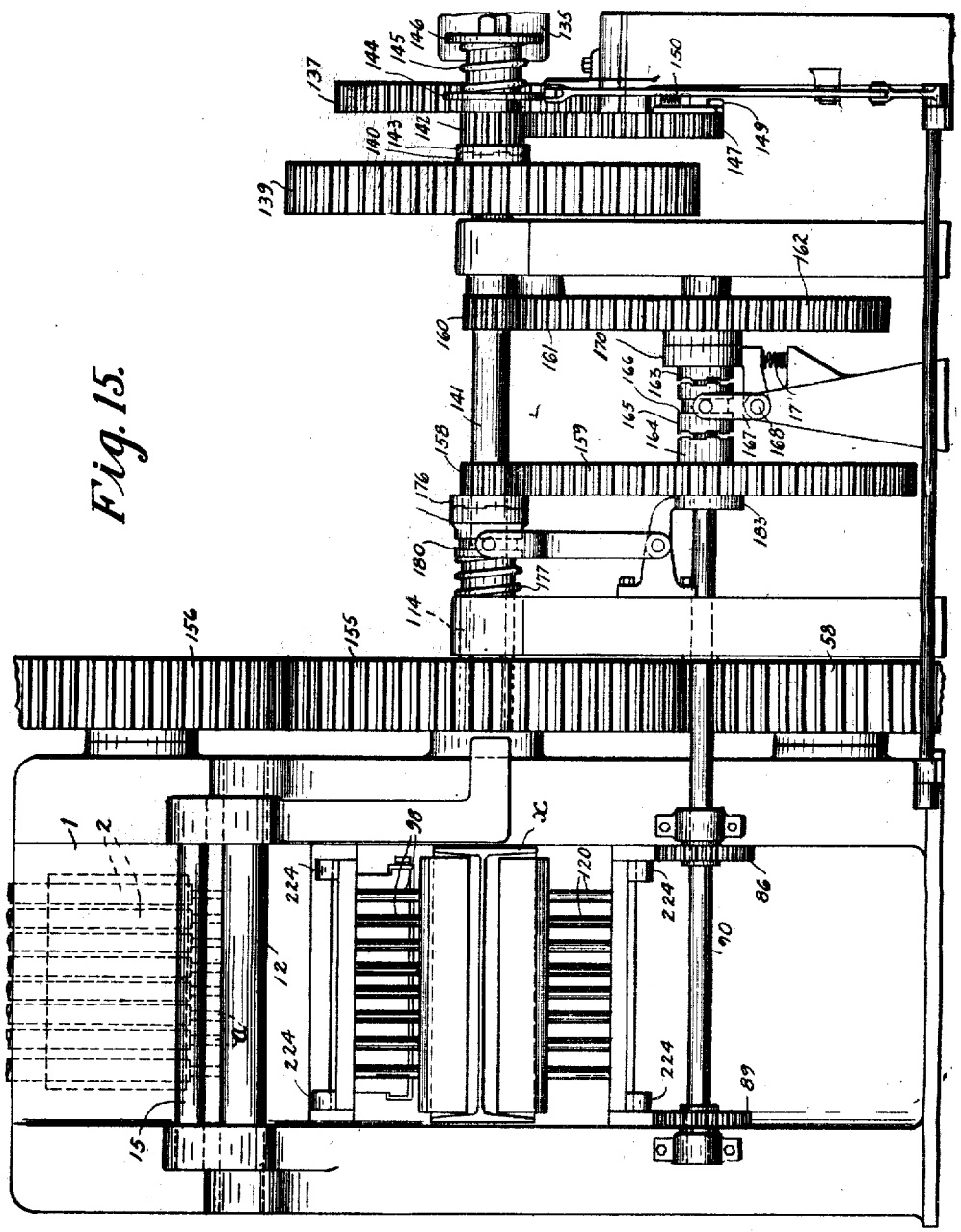

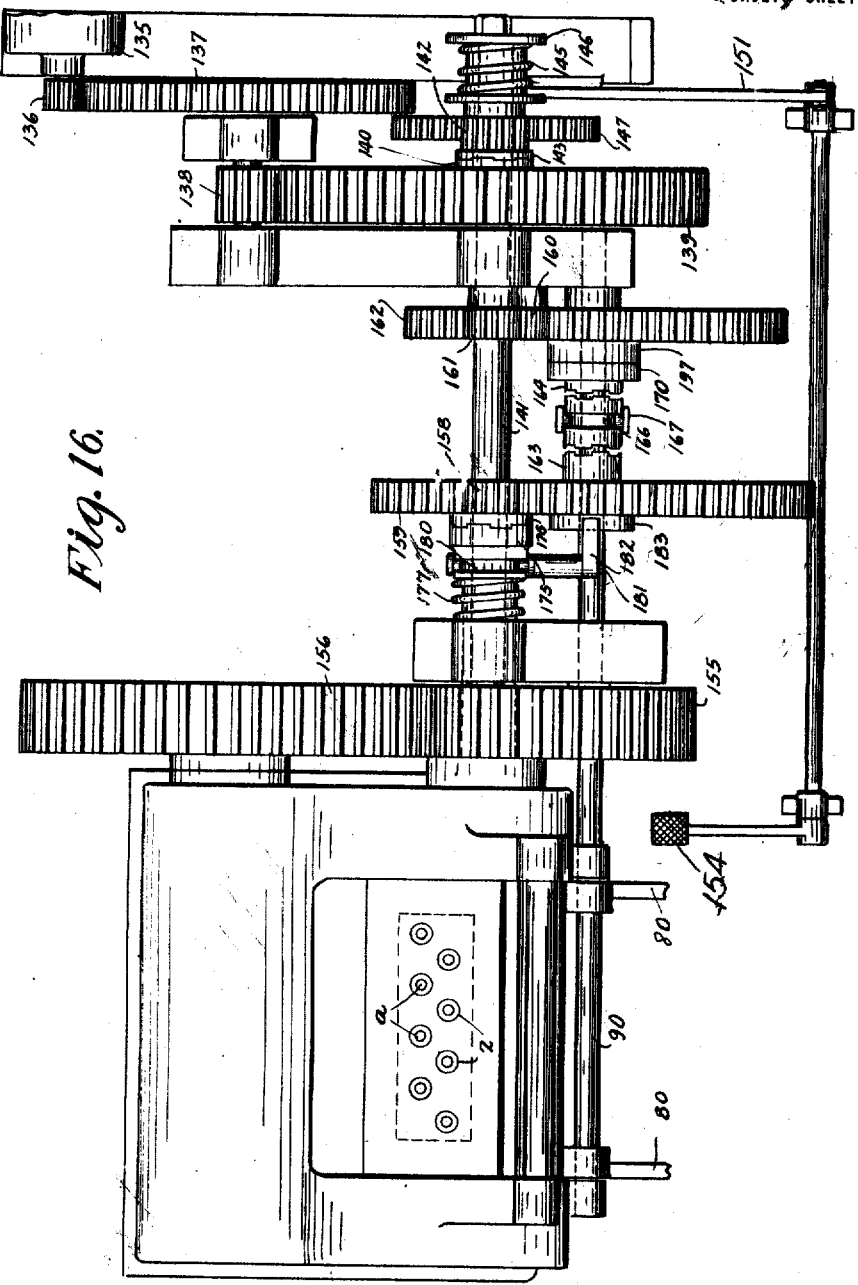

UNITED STATES PATENT OFFICE.

THEODORE P. PAYNE, OF NEWARK, NEW JERSEY, ASSIGNOR TO STEEL UTILITIES, INCORPORATED, A CORPORATION OF NEW YORK.

RIVETING-MACHINE.

1,241,250.  Specification of Letters Patent.  Patented Sept. 25, 1917.

Application filed March 5, 1914. Serial No. 822,759.

*To all whom it may concern:*

Be it known that I, THEODORE P. PAYNE, a citizen of the United States, residing at Newark, New Jersey, have made certain Improvements in Riveting-Machines, of which the following is a specification.

The invention relates to riveting machines, and more especially to machines for riveting together structural shapes and like work, as for instance, the riveting together of standard connections of angles with beams, girders, channels and the like.

Objects of the invention are to provide a machine for completely performing the work of riveting all the way from the cutting or making blanks from rods to the finished riveted work; to provide for the automatic performance by the machine of the entire sequence of functions or operations for the foregoing; to provide for the complete riveting of the parts of the work together at one operation, simultaneously forming all the rivets employed in the juncture of the superposed shapes; to provide for the simultaneous making of a plurality of rivets sufficient in number for the particular riveting operation; to provide for the proper positioning and alinement of the various pieces of the work with respect to each other preparatory to riveting; to provide for the preliminary alining of the holes in the different pieces of the work with respect to each other; to provide for the simultaneous riveting of all the holes in the work; to provide for the formation of the entire rivet in the work itself, that is, in the rivet holes in the work; to provide mechanism for completing the entire riveting operation from a single heating of the material; to provide for the last foregoing in a single sequence or cycle in the machine; to provide a new method of riveting together pieces or parts, utilizing and realizing many of the objects and features above pointed out. These and other objects of invention will be set forth hereinafter in part and in part will be obvious herefrom.

The invention consists in the novel parts, constructions, arrangements, combinations and improvements herein shown and described.

The accompanying drawings, referred to herein and constituting a part hereof, illustrate one embodiment of the invention, and together with the description serve to explain the principles thereof.

Of the drawings:

Figure 1 is an elevation, in central section (on line A—B in Fig. 2) of a machine embodying the principles of the invention;

Fig. 2 is an end elevation looking at Fig. 1 from the right but showing the full width of the machine;

Fig. 3 is a top plan corresponding to Fig. 2;

Fig. 6 is a fragmentary sectional view, on an enlarged scale, showing the cutting off from the heated rod of a rivet blank;

Fig. 7 is a similar view to Fig. 6, showing the hot blank being conveyed to the work;

Fig. 8 shows the blank positioned with respect to the work and ready to be forced therethrough, to form the completed riveted joint as shown in Fig. 5;

Figs. 10 and 14 are fragmentary details; and

Figs. 12, 13, 15, 16 and 17 show a somewhat different form of some of the mechanisms.

Fig. 11 is an enlarged detail of rods 31 and coöperating parts.

Figure 5:
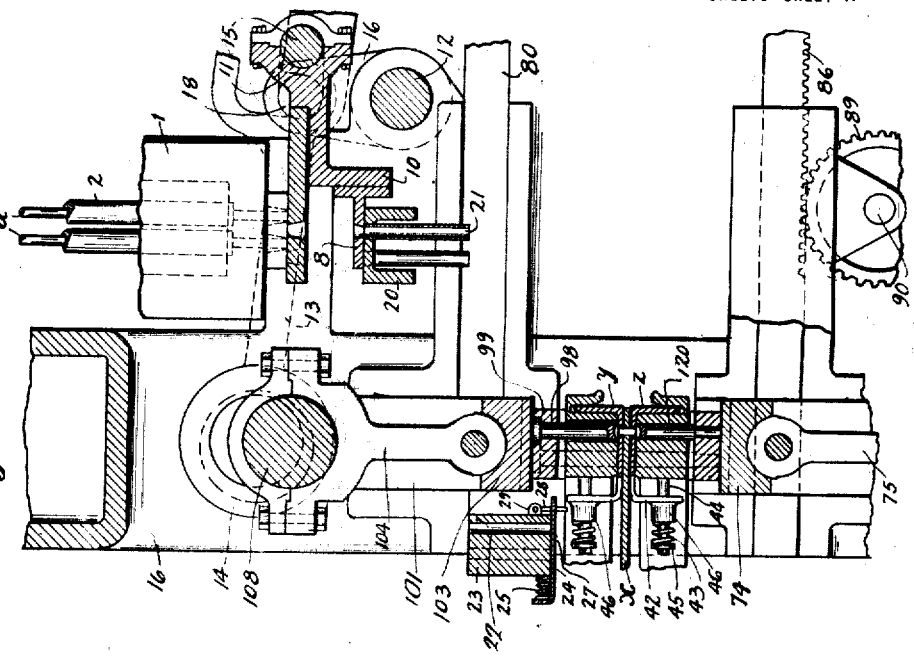
Fig. 5 is a similar view to Fig. 4 but showing a still different position of the mechanism.

Referring to the accompanying drawings, illustrating by way of example one embodiment of the invention, means are provided, in accordance with one feature of the invention, for maintaining a supply of rivet forming rods, and for heating same and for cutting off therefrom rivet blanks preparatory to forwarding same through the machine to rivet the work together. Said means, in accordance with one feature of the invention, simultaneously handles or provides for the full complement of rivets for a given joint in the work, the blanks therefor being all simultaneously forwarded to the machine and all the rivets formed simultaneously in the work, As embodied, the rivet making material is preferably in the form of round rods $a$, sufficient in number for the particular kind of work being done. The embodied form of heating means for the rods comprises a gas muffle 1 of suitable refractory material, having a plurality of tubes 2, vertically arranged, within which are the vertically positioned rods $a$. The muffle will be of suitable construction, and so far as concerns the broader features of the invention, other forms of heating devices can be used.

Means are provided for cutting off from the heated rod or rods pieces of right length for forming the rivets, and further for simultaneously cutting off from a plurality of the heated rods the proper number of blanks for the number of rivets required to complete a particular joint in the work being operated upon by the machine. As embodied, the rods $a$ project through the bottom end of the heating device, such as the muffle 1. (See Figs. 1, 6 and 7.) Beneath the muffle 1 is shown a plate 4 having apertures 5 therein corresponding in number to the rods used, which apertures contract or are beveled toward their bottom or outer edge. Traveling reciprocably beneath the plate 4, is a plate 6, having a series of apertures 7 therein corresponding to the apertures 5 in the plate 4. Fixed to the plate 6 to travel reciprocably therewith is a plate 8, said plate 8 having therein a series of apertures 9 corresponding to the apertures 7 in the plate 6. The plates 6 and 8 are connected together by a suitable connecting piece 10, plate 8 being vertically adjustable, the structure being mounted on suitable guides on the frame of the machine. The connecting piece 10 is provided with arms 11, which embrace a rod 15, having its bent or offset ends 18 engaging in the angled slots 17 formed in the eccentric rod 13 (Figs. 1, 2, 4, 5 and 17). Rod 13 is reciprocated by an eccentric 14 on shaft 108 (Figs. 1, 4, 5 and 17). The ends 18 of rod 15 are supported by rock arms 16, mounted on a shaft 12, which shaft is mounted in brackets on the frame of the machine (Figs. 1, 2, 4, 5 and 11). The tail 19 of rod 13 is bent to rest upon the top reach of frame 80 (Fig. 1). Thus when frame 80 moves to the left in Fig. 1, rod 13 drops and does not actuate plate, but when frame 80 is at or near its extreme right hand position, it engages tail 19 of rod 13 and plate 10 is actuated at the proper time to cut off the rivet blanks from the rods $a$.

Beneath the plate 8, and preferably in sliding contact therewith, is a plate or other supporting structure 20, carrying a plurality of tubes 21, which tubes are adapted to receive the rivet blanks cut off from the rods $a$ and to transmit the blanks to suitable forwarding devices. The hot cut off blanks $b$ from the tubes 21 are dropped into receiving apertures 22 in a slidable block 23, which block serves as a conveyer of the blanks $b$ toward the work. For the purpose of discharging or passing on the blanks $b$ from the carrier 23 at the proper time, the bottom 24 of the block 23 is slidably mounted upon the block 23 and is spring pressed toward the left (in Figs. 1, 6, 7 and 8) by springs 25 acting on bent-up lugs 26 formed upon the bottom plate 24. In the bottom plate 24 are a series of apertures 27, which apertures are out of alinement or registry with the tubular apertures 22 in block 23 when the bottom plate 24 is moved to the left by the springs 25. Pivotally mounted upon the block 23 are tripping fingers 28, being pivoted to brackets 29 fixed on the block. The fingers 28 extend through apertures in the bottom plate 24, and the arrangement is such that as the block 23 travels to the left, the fingers 28 at the proper time encounter a suitable stop, and the bottom plate 24 is moved to the right, thus bringing the apertures 27 into alinement with the tubular apertures 22, and the rivet blanks are thus permitted to drop downwardly, or to be pushed, through the apertures 27 in the bottom plate 24.

The manner of operation of the previously described mechanism is substantially as follows:

The heated rods $a$, vertically arranged in the muffles 1, rest upon the top surface of the plate 6, as the plate 6 travels toward the right in Fig. 7. As the apertures 7 and 9 come into alinement or registry with the apertures 5 (as shown in Fig. 6), the rods $a$ drop downwardly and rest upon the top surface of the plate 20. The apertures 5 and 7 are so formed that their contacting edges form cutting surfaces. As the plates 6 and 8 start toward the left in Fig. 6, the rods $a$ are cut off at the contacting faces of the plates 4 and 6, leaving the cut off bottom ends of the rods $a$ as a gang or complement of blanks $b$ of the right length for the rivets to be formed and supported in the plates 6 and 8. As the plates 6 and 8 travel to the left to the position shown in Fig. 7, this series or complement of blanks is carried forward in vertical position. The lower ends of the rods $a$ are supported upon the upper surface of the plate 6 until the completion of the return travel of the plates 6 and 8 as already described. As the plates 6 and 8 travel to the left from the position of Fig. 6 to that of Fig. 7, the apertures 7 and 9 come into registry with the tubes 21 carried by the plate 20, the apertures 22 in block 23 being in line beneath tubes 21. Thereupon the gang or series of hot rivet blanks $b$ drop downwardly, directed by the tubes 21, into the tubular apertures 22 in the block 23. The block 23 then moves to the left from the position shown in Fig. 7 to that shown in Fig. 8, wherein the rivet receiving tubes 47ᵃ and the tubes 22 are in register, the block 23 being so moved by reason of its being mounted at either end thereof upon the opposed frame members 80 (see Figs. 4, 5, 12 and 13) which frame is reciprocated by the gears 89 on the shaft 90. The manner of discharge of the hot blanks from the block 23 has already been described in connection with the description of the structure itself.

Suitable means are provided for feeding in and positioning the work preparatory to riveting. As embodied, said work feeding and positioning means is shown operating upon a standard connection of an I-beam $x$ and its two angle plates $y$ and $z$. Said positioning means comprises also alining devices and gripping or clamping devices for holding the different parts of the work together. As embodied, the underneath clamping and alining device comprises an alining or gage plate 40, which is outwardly flared at its upper end to receive the flange of the angle plate. (See especially Figs. 1, 4, 5 and 8 for these constructions). Just within the gage 40 the supporting block 41 is slotted or channeled to receive the flange of the lowermost angle plate $z$, the web of the angle plate lying along the upper surface of the block 41. Fingers 42, slidably mounted on rods 44 by hubs 46, engage the forward end of the web of the angle piece $z$, said fingers being spring pressed in a suitable manner, as by coiled springs 43. Springs 43 are coiled about the rods 44, and are in compression between a suitable stop 45 on said rods and the hubs 46 of the fingers 42. In the block 41 are formed apertures 47, in fixed or definite position and relation with respect to the gage plate 40, whereby when the angle piece $z$ is firmly pressed to the gage 40, the punched rivet holes in the angle piece $z$ will be in alinement with the apertures 47 in the supporting block 41. The general structure of the upper or superior clamping block 48, is generally similar to the lower or inferior one just described, and corresponding reference numerals have been applied thereto and further description thereof will be unnecessary.

Means are provided for separating the clamping blocks 41 and 48 to permit the insertion of the work and for bringing them together to aline the work and to hold it in alined position. As embodied, the block 41 is carried on arms or brackets 49 connecting to a cross-piece or cross-head 50. The upper block 48 is connected by arms or brackets 51 to a cross-head 52. The cross-heads 50 and 52, at their ends are mounted in threaded engagement with screw-threaded rods 53 and 54 by right and left hand threads, whereby upon the rotation of the rods 53 and 54 the cross-heads 50 and 52 are moved either toward or from each other. The rod 53 is rotatably mounted in bearings 55 and 56 upon the machine frame, and the rod 54 is rotatably mounted in like bearings 57 and 58 upon the machine frame. Fixed to the rod 53 is a worm wheel 60 and a like worm wheel 61 is fixed to the rod 54. The worm wheel 60 meshes with a threaded portion 62, and the worm wheel 61 meshes with a threaded portion 63, upon a driving shaft 64. The shaft 64, at the proper time in the cycle of the machine is rotated in one direction to rotate the screw-threaded rods 53 and 54 to open apart the clamping blocks 41 and 48; and at another time in the cycle of the machine said shaft 64 is rotated in the opposite direction to bring together the blocks 41 and 48 to position and clamp the work.

The angle plates $y$ and $z$, or other like work being operated upon, have their previously punched rivet holes brought into alinement with the apertures 47 and 47ᵃ by the alining devices, it being the practice in the art to punch the rivet holes in measured or fixed distances from the face of the angle flange. Means are provided by the invention for insuring or procuring the alinement of the rivet holes in the different pieces of the work, such as the superposed I-beam $x$ and the angle plates $y$ and $z$. In the embodied form of such means there are provided alining pins 70, corresponding in number and location to the number of rivet holes, and adapted to pass inwardly through the apertures 47 and into the rivet holes in the different plates or pieces to bring the rivet holes into alinement each with the other. The alining pins 70 are beveled at their points, and are enlarged from the point backwardly, so that as they pass through the work they will be enabled to impart a slight movement to the beam or other part in case it is slightly out of alinement. The alining members 70 are mounted upon a supporting plate 72, which plate is carried with arms 83 in their horizontal movement, but said plate 72 and the alining members 70 are reciprocable in a vertical guideway 73 from below into and through the rivet holes in the work. The supporting plate 72 is movable onto and away from a reciprocating head 74, reciprocating in the guideway 73. Pivotally connected to the head 74 are connecting rods 75, which rods have eccentrics 76 mounted on shaft 77. The vertical reciprocatory movement of the plate 72 thus carries the alining pins through the rivet holes in the beam and the two angles to bring them into alinement preparatory to passing the rivet blank therethrough.

Means are provided by the invention for alining the rivet holes as already described, presenting in position to the rivet holes the requisite number of hot blanks and forcing the blanks through the alined rivet holes and forming the heads upon the rivets, all being performed sequentially or at one operation. In the embodied form of such means, there are provided three-sided rectangular frames 80 and 81 reciprocably mounted respectively at each side of the machine in guide-ways formed in the side frame of the machine. The frame 80 is mounted in guide-ways 82 and 83 in one side frame, and the frame 81 is mounted in guide-ways 84 and 85 in the other side frame. Formed on the lower edge of the lower reach of the frame 80 is a straight gear 86, and a corresponding straight gear 87 is formed on the lowermost reach of the frame 81. Meshing with the gear 86 is a pinion 88, and meshing with the gear 87 is a pinion 89, both said pinions being mounted upon and fixed to rotate with a driven shaft 90.

In the preceding description and statement of operation, the progress through the machine of the rivet blank $b$ was described up to the point of their deposition in the block 23.

The block 23 is carried upon and between the upper horizontal reaches of the frames 80 and 81, and thus travels to and fro with said frames from the position beneath the tubes 21 (Figs. 6 and 7) where it receives the rivet blanks to a position above the apertures 47ª (Fig. 8) into which it discharges the rivet blanks preparatory to their being forced into the rivet holes in the work, the block 23 then passing onward to the left (Figs. 4 and 5) to permit of the riveting tools operating on the rivets through apertures 47ª.

Figure 4:
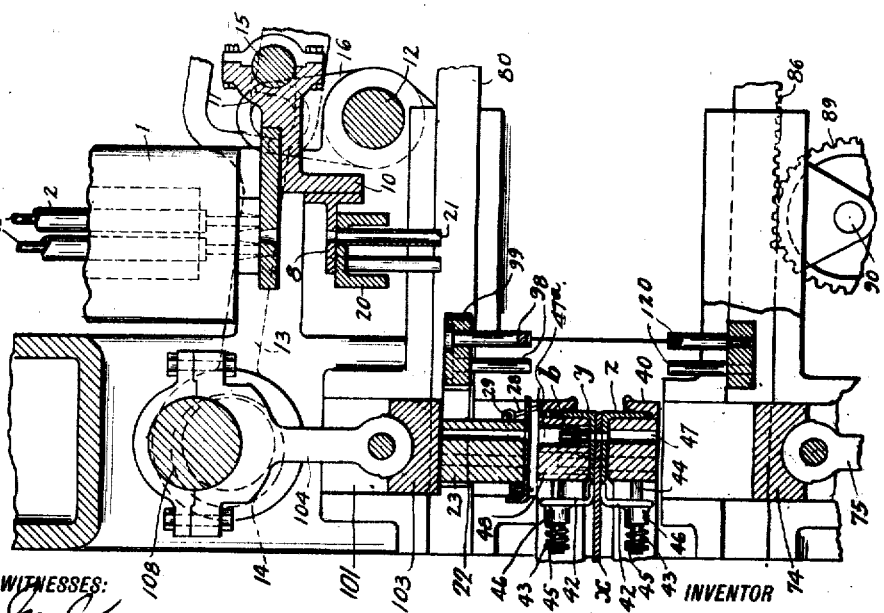
Fig. 4 is a fragmentary central section, on an enlarged scale, of the central portion of Fig. 1, but showing the mechanism in a different position.
Figure 17:
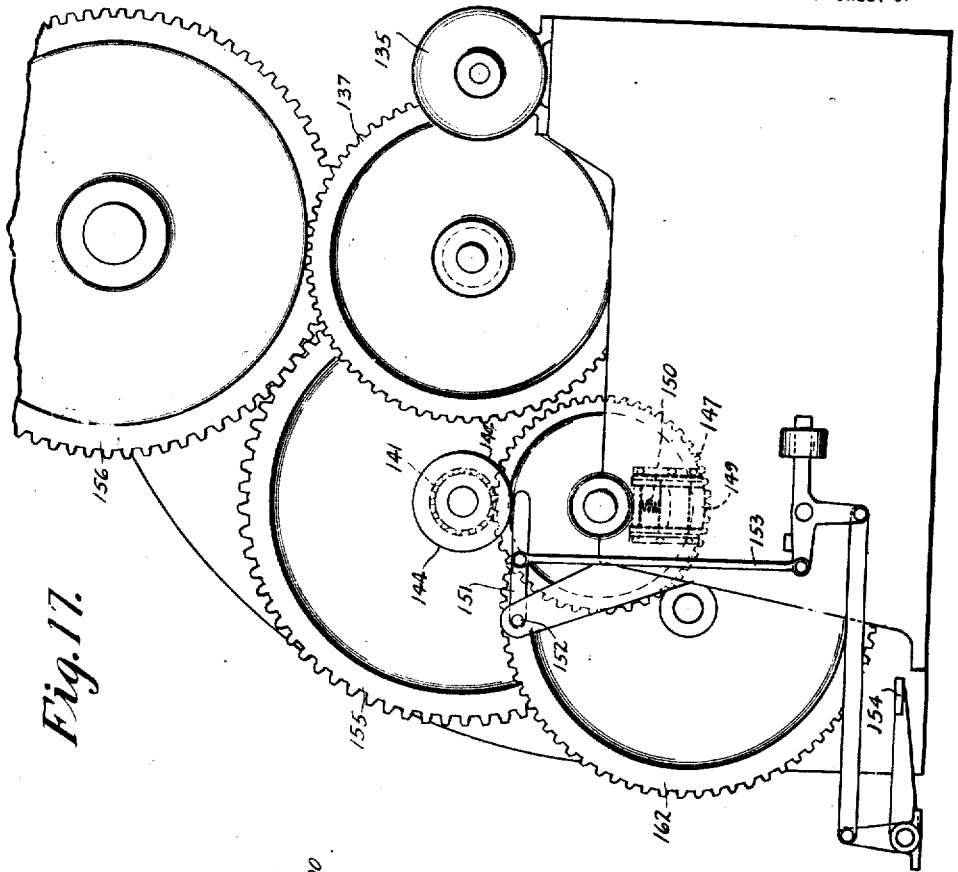

In the embodied form of riveting means, plungers engage the rivet blanks $b$ in the apertures 47ª in the clamping block 48 and force them through the rivet holes in the work and into contact with rivet head forming plungers which come through the apertures 47 in the clamping block 41 into position at the opposite end of the rivet holes in the superposed shapes (Figs. 4 and 5). Further, as embodied, said riveting tools comprise a series of plungers 98 mounted in a supporting plate 99, said plungers having heads 100 resting in enlarged recesses in the upper surface of the plate 99, the shanks of the plungers 98 projecting downwardly through apertures in the plate 99. The ends of the plate 99 rest respectively in the guide-ways 82 and 84. One end of the plate 99 has its vertical edges beveled and fitting between projections 94 and 95 (Fig. 10) upon the upper horizontal reach of the frame 80. The other end of the plate 99 also has its vertical edges beveled and resting between projections 96 and 97 (Fig. 10) on the upper horizontal reach of the other reciprocating frame 81. Vertically disposed guide-ways are formed in or on the vertical portions of the side frames, a guide-way 101 intersecting the guide-way 82, and on the other side of the machine a corresponding vertical guideway intersecting the guide-way 84. Reciprocably mounted in said guide-way 101 is a head 103. Said head 103 is pivotally carried by connecting links 104 at either side thereof, said links having respectively eccentrics 106 and 107 upon driven shaft 108. The lower part of the head 103 (Fig. 2) has an undercut or dove-tailed extension 109, and on the upper face of the plate 99 are formed corresponding projections 110 and 111, whereby the plate 99 as it reciprocates may pass into and out of engagement or operative connection with the head 103.

On the lower horizontal reaches of the two frames 80 and 81 are mounted supports for the coöperating formers for the opposite heads of the rivets, which formers enter through the apertures 47, coming up to the ends of the rivet holes on the under side of the shapes to form the rivet heads on the blanks as they are forced through by the plungers 98 (Fig. 5). Mounted in a supporting plate 121 is a series of such plungers 120. The supporting plate 121 may be similarly constructed and arranged relatively to the guideways 83 and 85 and relatively to the lower horizontal reaches of the frames 80 and 81 as the arrangement and construction of the plate 99 relatively to the guide-ways 82 and 84 (described above and shown in Fig. 10) and detailed description thereof will be unnecessary. Reciprocably mounted in the lower part of the guide-way 101 is a head 74, previously referred to. Upon the upper surface of the head 74 is an undercut or dove-tailed projection 122, and the supporting plate 121 has projections 123 and 124 formed thereon whereby in its reciprocatory travel said plate 121 will pass into and out of engagement with the head 74.

In the apertures 47ª there are provided means for lightly holding the rivet blanks until the forming plungers beneath are in position and the plungers 98 are likewise in position to force the blanks through the work to form and complete the rivets. As embodied, tubes 125 are placed within the apertures 47ª and are slotted at their lower ends, and such lower slotted ends are resiliently bent inwardly toward each other as shown in Figs. 1 and 8.

Suitable means for feeding in the beams $x$ are provided, and may be of any desired form so far as concerns the broad features of the invention, and the embodied means for this purpose comprises a series of supporting rollers 127, which may be idle rollers or driven rollers as desired or found convenient.

The manner of operation of the mechanisms just described is substantially as follows:

It may be assumed that the work is an I-beam and its two angle plates, and that the parts have been positioned as shown in Fig. 1. The lowermost angle is laid in position upon its supporting block and aliner 40, the beam $x$ is run in, and the upper angle is placed in position with respect to its aliner 40, and the shaft 64 is rotated in the proper direction to bring the blocks 41 and 48 together to grip the work, the alining fingers 42 pressing the two angle plates $y$ and $z$ against their respective aliners 40. The supporting plate 72 for the alining fingers 70 is in position with respect to the vertical guideways 101 in the frame, and the plate 72 is also in engagement with the part 122 of the head 74. As the shaft 77 rotates the head 74 is pushed upwardly, and the alining fingers 70 are pushed through the rivet holes and the work is brought into exact alinement so that the rivet holes in the beam and in the two angle plates are in alinement with each other. The head 74 then recedes bringing the plate 72 back into register with the lower horizontal reaches of the frames 80 and 81.

The shaft 90 then begins rotation, and the frames 80 and 81 are slid toward the left in the guideways 82 and 83, and the guideways 84 and 85, respectively. It will be recalled that the rivet blanks $b$ are resting in the apertures in the block 23 upon the bottom plate 24. As the block 23 slides to the left, it passes from the position shown in Fig. 7 to that shown in Fig. 8. As it approaches the position shown in Fig. 8, the tripping fingers 28 encounter the edge of the angle $y$, or some other suitable trip, and the bottom plate 24 is slid against its spring 25 and the apertures 27 in the bottom plate 24 are brought into alinement with the blanks $b$.

The block 23 pauses momentarily and the blanks $b$ are dropped into the apertures 47$^a$, and are slightly held by the spring fingers 126. (See Fig. 4). The movement of the frames 80 and 81 to the left continuing, the upper plate 99 carrying the plungers 98, and the lower plate 121 carrying the plungers 120, come into alinement with the vertical guide-ways 101. It will be understood that these plates are carried along horizontally by means of their engagement with the frames 80 and 81 (Fig. 10), and the plate 99 rides onto the projection 109 upon the head 103, and the plate 121 rides onto the projection 122 upon the head 74. By the rotation of the shafts 108 and 77, the series or gang of plungers 120 are brought up into position against the lowermost angle plate $z$ as shown in Fig. 5, and the gang of plungers 98 entering the apertures 47$^a$ force the blanks $b$ through the rivet holes in the work and into the recessed heads of the opposed plungers 120, and the rivets are thus completely formed in position in the work.

As the heads 74 and 103 recede, they carry backward the supporting plates 99 and 121 until plate 99 passes into alinement with the projections 94 and 95 on the frame 80 and with the projections 96 and 97 on the frame 81, and plate 121 passes into alinement with the corresponding projections on the bottom reaches or sides of the frames 80 and 81. The frames 80 and 81 begin their return reciprocation, to the right in Fig. 1, and the plates 99 and 121 pass to the right therewith and out of engagement, respectively, with the heads 103 and 74. The movement of the frames 80 and 81 to the right continues until the mechanism is brought again to the position shown in Fig. 1.

By the process included in my invention, a hot blank, or series of blanks, is cut of precise length and size for the particular rivet or series of rivets to be formed, and such blank or series of blanks, is forced into the rivet holes in the assembled work and the entire rivet is formed in the work. Furthermore by my process, the ends of the blank are slightly chilled in the cutting, and when the rivet is formed in the work the central portion thereof, that is the portion forming the stem of the rivet is slightly more plastic or fluent than the two ends of the blank, and the resulting pressure insures that the entire space of the rivet holes through the work will be completely and tightly filled making a fixed and rigid and unusually strong joint. By my process also the rods are continuously fed through the furnace and kept at the required temperature, and the blanks are cut off therefrom a complete series or gang at a time as needed. By my process the blanks are cut off while hot, and are headed and completely formed in the work while so heated, the heads on each end of the blank being simultaneously formed.

In accordance with one feature of the invention the riveting dies and plungers, the heating furnaces or other heating means, and various other parts are removable and interchangeable with respect to the other parts of the machine, whereby rivets and work of different sizes may be operated upon, and gangs or series comprising different numbers of rivets may be used at one time.

Suitable driving devices are provided, and as embodied a suitable motor 135 has a pinion meshing with a gear 137. Fixed to the shaft of gear 137 is a pinion 138 meshing with a gear 139. Fixed to gear 139 is clutch member 140. Gear 139 and its clutch member are loosely mounted on shaft 141. Splined to shaft 141 is a pinion 142, and fixed to pinion 142 is the companion clutch 136 member 143 for the member 140. Fixed to pinion 142 is a flange 144. A spring 145 is coiled about shaft 141 and is in compression between flange 144 and a collar 146. Meshing with pinion 142 is a gear 147 carried on a stub shaft journaled in a bearing 148. The pinion 142 and gear 147 are in a three to one ratio.

Carried on gear 147 is a sliding cam 149, which is spring impelled outwardly, by spring 150. Cam 149 is adapted to engage flange 144 and separate clutch members 140, 143 to stop shaft 141. Cam 149 is left in position for so holding out the clutch, and thus keeping shaft 141 at rest, until said cam 149 is withdrawn against its spring 150, when the clutch members are moved into engagement by spring 145 and shaft 141 is again rotated. The illustrated means for moving cam 149 back against its spring comprises a lever 151 pivoted at 152. This lever is actuated through suitable connections 153 from a foot lever 154. Mounted on shaft 141 is a gear 155 driven by shaft 141 but having an intermittent motion device interposed, and which will be hereafter described. A gear 156 meshes with gear 155, the gear 156 being fast on shaft 108. A corresponding gear 157 is fast on shaft 77. The requisite periodic or intermittent reciprocatory movement is given to plunger heads 103 and 74 by their respective shafts 108 and 77, with the intervening eccentric and link mechanism (Figs. 1, 4, 5, 12 and 13).

The embodied form of actuating means for the reciprocating frames 80 and 81 comprises a periodic, intermittent drive for shaft 90. Fixed on shaft 141 is a pinion 158, and meshing therewith is a gear wheel 159 loose on shaft 90. Also fixed on shaft 141 is a pinion 160. Pinion 160 meshes with an idle pinion 161, mounted on a stub shaft on the machine frame. Meshing with idler 161 is a gear wheel 162, likewise loose on shaft 90. Fixed to gear 162 is a clutch member 163, and a similar clutch member 164 is fixed to the other loose gear 159. Between clutch members 163 and 164 is a sliding clutch member 165, splined on shaft 90 and adapted to pass into and out of engagement alternately with the clutch members 163 and 164. As gears 159 and 162 travel in opposite directions, clutch member 165 serves to reverse the direction of rotation of shaft 90 and correspondingly the travel of frames 80 and 81. For the purpose of sliding clutch member 165, there is provided an annular groove 166 therein. Working in said groove is a yoked bell crank lever 167 pivoted at 168. The other end of said lever 167 bears on a cam 170, carried on gear 162. Spring 171 holds the bell crank lever to cam 170.

The intermittent motion, previously referred to, is imparted to gear 155 for the purpose of correlating the movements of plungers 103 and 74 with the movements of frames 80 and 81, and the coöperating devices, as for instance the passing of the plunger carriers 99 and 121 from the frames 80 and 81 onto the heads 103 and 74 and their detachment therefrom. As embodied, a gear wheel 155 is sleeved on shaft 141 by a sleeve 174, which sleeve has splined thereon a clutch member 175. Said clutch member 175 coöperates with a clutch member 176 fast to pinion 158. Clutch member 175 is urged into engagement with member 176 by a spring 177. A yoked bell crank lever 179 engages in an annular groove 180 formed on clutch member 175. Lever 179 is pivotally mounted at 181, and has an offset arm 182 bearing on cam 183 fixed to gear 159. Gear wheel 159 and its cam 183 rotates and stops with shaft 141, as already described, and gear 155 is correspondingly started and stopped. In addition, by the mechanism just described, the requisite intermittent movement and dwell is imparted to gear 155 during the rotation of shaft 141.

Means are provided for imparting proper movement to shaft 64, and the exemplified form thereof comprises a friction drive 184 connecting with a shaft 185. Loose on shaft 185 is a sprocket driven clutch member 186, driven by a sprocket chain 187, from a sprocket wheel 188, which sprocket wheel is fixed to pinion 158. Also mounted loosely on shaft 185 is a sprocket driven clutch member 189, driven by a sprocket chain 190 from a sprocket wheel 191, fixed to the idle or intermediate pinion 161. Thus clutch members 186 and 189 are driven in opposite directions. Splined on shaft 185 between said clutch members 186 and 189, is a two faced clutch member 192. A yoked bell crank lever 193 engages in an annular groove 194 in clutch member 192. The other arm 195 of the bell crank lever connects to a pivoted, spring pressed rod 196. Said rod 196 is reciprocated by a cam 197 fixed to gear 162, (which also carries cam 170). Thus the proper intermittent reversible rotary movement is imparted to shaft 64, and by the friction drive a firm clamping action is exerted upon the assembled shapes.

Means are provided by the invention for determining and regulating the length of rivet blanks to be cut off from the rods $a$ so that the blanks will be of just the right length for the rivets in the particular work being operated upon. As embodied, said means comprises a vertical adjustment for the block 20 upon the upper face of which block the lower ends of rods $a$ rest prior to cutting. The vertical positioning of block 20 is effected or determined by slidable wedges or cams 200, working in guideways in the machine frame and working under correspondingly beveled bearings or extensions 201 on the block 20 (see Figs. 12, 13 and 14). The wedges or cams 200 are connected by pivotal links 202 to bell crank levers 203, pivoted at 204. The other arms 205 of said bell cranks are in the paths of extensions 206 on clamping block 48. Thus the position of clamping block 48 being determined by the thickness of the assembled work, the cams 200 are likewise positioned to correspond to the thickness of the assembled shapes, and the block 20 is thus positioned to permit of the proper downward feed of rods *a* to permit the slides 6 and 8 to cut off the blanks from said rods of just the right length for the rivets for the particular work.

The form of actuating means for the sliding cutters 6 and 8 shown in Figs. 12 and 13, comprises a cam 207 on shaft 141. Coöperating with said cam is a lever 209 fixed to a rock shaft 210. Fixed to shaft 210 are arms 211, and a flat link 212 is pivotally carried by said arms 211. The link 212 at its other end embraces a rod 213 carried by arm 11 on the piece 10. The lever 209 is moved to the right in Figs. 12 and 13 by its cam 207 to effect the cutting of the rivet blanks, and the lever 209 is returned into operative position with its cam 207 in time for the next succeeding cut of the rivet blanks by a suitable lug or trip on frame 80. Another form of means for actuating the rivet blank cutters has previously been described.

Means are provided by the invention for automatically varying or regulating the travel and position of the rivet forming devices for assembled shapes of different thickness or sizes.

Figure 14:
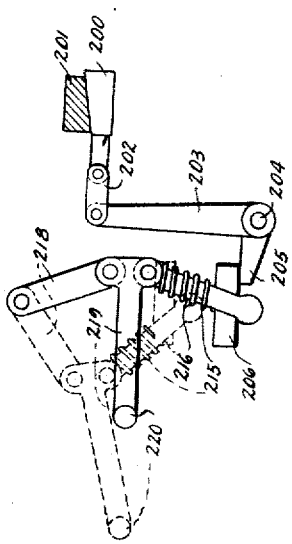
Figure 9:
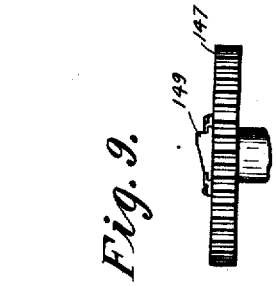
Fig. 9 is a fragmentary detail in elevation of the cam release for the plunger actuating shaft.

As embodied the said devices comprise means for pressing together by adjustable and resilient pressure the clamping blocks 41 and 48. Said resilient means have, in accordance with one feature of the invention, resilient lost motion devices for moving the clamping blocks toward and from the work and for holding them to the work (Figs. 12, 13 and 14). Describing in detail the upper clamping block 48 and its coöperating parts, said block has in the extensions 206, heretofore referred to, apertures in which work the toggle links 216 (Figs. 12, 13 and 14) which have enlarged ends to keep them connected. Springs 215 are coiled about links 216 in compression between the upper ends of said links and the parts 206. The other links 218 of the toggles are pivoted at suitable points on the machine frame. The links 217 and 218 at each side of the machine are pivoted to a central slidable link 219, each link 219 having a pin 220 working in an actuating slot 221 in the upper reach of the corresponding frames 80 and 81. The devices for the underneath clamping block 41 are generally similar and need not be further described in detail.

The embodied form of means for varying the position or travel of the rivet forming devices comprises devices interposable in varying magnitudes between the carriers for the rivet forming devices and the plunger heads 103 and 74 which carry them to and from the work. Resting on the tops of, and extending over the series of rivet formers 99 are a series of relatively thin plates 222. Just to the right of the series of plates 222 when so positioned (Figs. 12 and 13) is a shelf 223, and spring retaining and guiding strips 224 are provided at each end of plates 222.

A plate 225 is carried by the clamping block 48. The corresponding devices for the lower rivet forming devices may be substantially the same and need not be described in detail.

The clamping blocks 41 and 48 are retracted from the work by the right hand end of the slots 219 (referred to Figs. 12 and 13) engaging pins 220 as shown in dotted line in Fig. 14, the frames 80 and 81 having the requisite travel for this purpose. After the work is positioned and the machine is started, the other end of slots 219 engage pins 220 and the toggles are moved to the position shown in Figs. 12 and 13. This brings the clamping blocks down on to the assembled and alined work with a strong spring pressure from the springs 215. The position of plate 225 is determined by the thickness of the work. The cutting of the rivet blanks, the forwarding of the rivet blanks to the work and the other concomitant steps will take place substantially as already described and will be understood without further amplification at this point. As the rivet forming devices move toward the left in Figs. 12 and 13, they meet plate 225 and ride up thereon more or less dependent upon the position of plates 225 as determined by the work. The plates 222 are correspondingly lifted. These engage the corresponding plunger head 103 or 74 and the plates 222 which are not required are automatically slid on to the shelf 223, the remaining plates 222 passing in between the rivet forming devices and the plunger head, and thus determining and regulating the travel and position of the rivet forming devices in conformity to the thickness of the work being operated upon.

The manner of operation of the entire machine will be clear from the various statements and descriptions of operation of various parts without further statement.

It will be understood that the machine has been provided embodying and realizing the objects and advantages set forth together with other objects and advantages.

The invention in its broader aspects is not limited to the particular embodiment shown and described, nor to any particular embodiment, but changes may be made therefrom, within the scope of the accompanying claims without departing from the principles of the invention and without sacrificing its chief advantages.

What I claim as my invention and desire to secure by Letters Patent is:—

1. A machine for riveting together structural shapes including in combination means for heating the end of a rod, means for advancing the heated rod longitudinally to cutting devices, means for cutting a rivet length from the heated end, means for alining and clamping a plurality of punched structural shapes, means for inserting the hot rivet in the rivet holes, and means for forming the rivet.

2. A machine for riveting together structural shapes including in combination means for heating the end of a rod, means for cutting a rivet length from the end of the heated rod, means for alining together a plurality of punched structural shapes, means for inserting the hot rivet blank in a rivet hole in the shape, and means for forming the blank into a rivet.

3. A machine for riveting together structural shapes including in combination a rod heating device, means for permitting a heated rod to drop to a gaging and cutting means, gaging means, means for cutting a rivet blank from the hot end of the rod, means for alining a plurality of structural shapes, means for carrying the hot rivet blank to the shapes, and means for forming the rivet heads.

4. A machine for riveting together structural shapes including in combination means for heating the riveting material, means for alining a plurality of structural shapes, means for dropping the hot blank and alining it with the rivet hole in the shapes, and means for riveting the shapes together.

5. A machine for riveting together structural shapes including in combination means for heating the riveting material, means for alining a plurality of structural shapes, means for dropping the hot blank and alining it with the rivet hole in the shapes, means for pushing the blank through the rivet hole in the shapes, and means for forming the rivet heads.

6. A machine for riveting together structural shapes including in combination clamping blocks for clamping together a plurality of structural shapes, one of said clamping blocks having an aperture for the introduction of the rivet blank, and means for riveting the shapes together.

7. A machine for riveting together structural shapes including in combination clamping blocks for clamping together a plurality of structural shapes, means for alining the rivet holes in the shapes, said clamping blocks being apertured to permit the passage of a rivet blank and of the alining means, and means for forming the rivet through the shapes.

8. A machine for riveting together structural shapes including in combination clamping blocks for clamping together a plurality of structural shapes, one of said clamping blocks being apertured, a traveling carrier having a rivet blank carrier and a blank inserting device passing successively into operation with the aperture in the clamping block.

9. A machine for riveting together structural shapes including in combination means for alining a plurality of structural shapes, means for supplying a rivet blank, rivet forming means, and a reciprocating head to operate the alining means and the rivet forming means successively.

10. A machine for riveting together structural shapes including in combination means for alining a plurality of structural shapes, means for supplying a rivet blank, rivet forming means, and a common operating means to operate the alining means and the rivet forming means successively.

11. A machine for riveting together structural shapes including in combination means for clamping together a plurality of structural shapes, one of said clamping members being apertured, a traveling rivet carrier and means for dropping the blank endwise into said aperture.

12. A machine for riveting together structural shapes including in combination means for clamping together a plurality of structural shapes, one of said clamping members being apertured, a traveling rivet carrier and means for dropping the blank endwise into said aperture and rivet forming means for forming the rivet through the shapes.

13. A machine for riveting together structural shapes including in combination rod heating means, means located therebeneath for cutting off a rivet blank, a blank carrier located therebeneath, shape clamping means located therebeneath, and rivet forming means at either side of the shapes to be riveted.

14. A machine for riveting together structural shapes including in combination rod heating means, means located therebeneath for cutting off a rivet blank, means for conveying the hot rivet blank to the work, shape clamping means located therebeneath, means for alining the rivet holes and rivet forming means at either side of the shapes to be riveted.

15. A machine for riveting together structural shapes including in combination means for alining a beam and its angle plates, said means comprising gages for the angle flanges, devices for pushing the angles against said gages and alining fingers entering the rivet holes in the flanges and beam, and means for riveting the alined parts together.

16. A machine for riveting together structural shapes including in combination means for receiving the end of a beam and its angle plates, and alining and clamping them together, said means comprising gages for the angle flanges and clamping devices on the opposite side of the flanges from said gages for pressing the angle plates and beam together, and means for riveting them together.

17. A machine for riveting together structural shapes including in combination means for alining the flange of an inferior angle plate, means for alining the flange of a superior angle plate, means for feeding in a beam endwise horizontally, clamping devices on either side of the assembled beam and angle plates and relatively movable to permit the feeding in of the beam and to clamp it when fed in and means for riveting the beam and angle plates together.

18. A machine for riveting together structural shapes including in combination means for supporting a plurality of assembled shapes, a head on one side of, and reciprocating to and from said shapes, a carrier traveling transversely to the path of travel of said head, said carrier having a plurality of rivet forming devices, a head on the opposite side of the work, a carrier traveling transversely to the path of travel of said head and having rivet forming devices adapted to coöperate with the rivet forming devices on the other carrier, said carriers each engaging its head to be thereby caused to coöperate and to rivet the shapes together.

19. A machine for riveting together structural shapes including in combination means for clamping together a plurality of assembled punched shapes, said clamping means comprising an apertured member, means for introducing a rivet blank into said apertured member, and means for forcing said rivet blank into the hole in the shapes and forming said blank into a rivet therein.

20. A machine for riveting together structural shapes including in combination means for positioning a plurality of punched assembled shapes with their holes in alinement, a head reciprocating toward and from said shapes, a rivet blank carrier and a rivet forming device traveling relatively to said reciprocating head, said carrier depositing a blank in operative relation to the assembled shapes, and said rivet forming device engaging said head and traveling therewith to form the rivet in the shapes.

21. A machine for riveting together structural shapes including in combination means for positioning a plurality of punched assembled shapes with their holes in alinement, a head reciprocating toward and from said shapes, a rivet blank carrier and a rivet forming device, common means for traveling said carrier and device transversely to the path of reciprocation of said head, means for disengaging said forming device from its traveling means and connecting it to said reciprocating head to be carried thereby into operative relation with said shapes.

22. A machine for riveting together structural shapes including in combination rod heating means including a refractory envelop about the rod, means for cutting off a blank from the heated end of the rod, means for placing the blank in the rivet holes of an angle plate and a beam, and means for forming the rivet.

23. A machine for riveting together structural shapes including in combination means for resiliently clamping two angle plates and an interposed member, means for inserting a rivet blank and means for forming the rivet.

24. A machine for riveting together structural shapes including in combination alining means comprising a pin entering the rivet holes in superposed structural members to aline the holes, and devices for pushing the pin into a hole and withdrawing it therefrom, and means for inserting a rivet blank through the alined holes from which the pin has been withdrawn, and means for forming the rivet.

25. A machine for riveting together structural shapes including in combination a group of pins spaced apart similarly to a group of rivet holes in superposed structural shapes, means for passing the pins into the rivet holes to aline them, means for inserting a plurality of rivet blanks in the alined holes, and means for simultaneously forming the rivets.

26. A machine for riveting together structural shapes including in combination means engaging the transverse legs or flanges of two angle plates to aline their rivet holes, means for moving the end of a beam between the angle plates and means for riveting the beam and angle plates together.

27. A machine for riveting together structural shapes including in combination means engaging the transverse legs or flanges of two angle plates to aline their rivet holes, means for moving the end of a beam between the angle plates, alining pins passing through the rivet holes in the beam and both angle plates, and means for riveting the beam and angle plates together.

28. A machine for riveting together structural shapes including in combination means engaging the transverse legs or flanges of two angle plates to aline their rivet holes, means, including a series of rollers upon which the beam rests on its flanges, for moving the end of a beam between the angle plates and means for riveting the beam and angle plates together.

In testimony whereof, I have signed my name to this specification, in the presence of two subscribing witnesses.

THEODORE P. PAYNE.

Witnesses:
 JOHN D. MORGAN,
 LOUELLA F. LITTLE.